Feb. 7, 1939. J. BACICA 2,145,964
ORNAMENTATION
Filed April 16, 1938 2 Sheets-Sheet 1
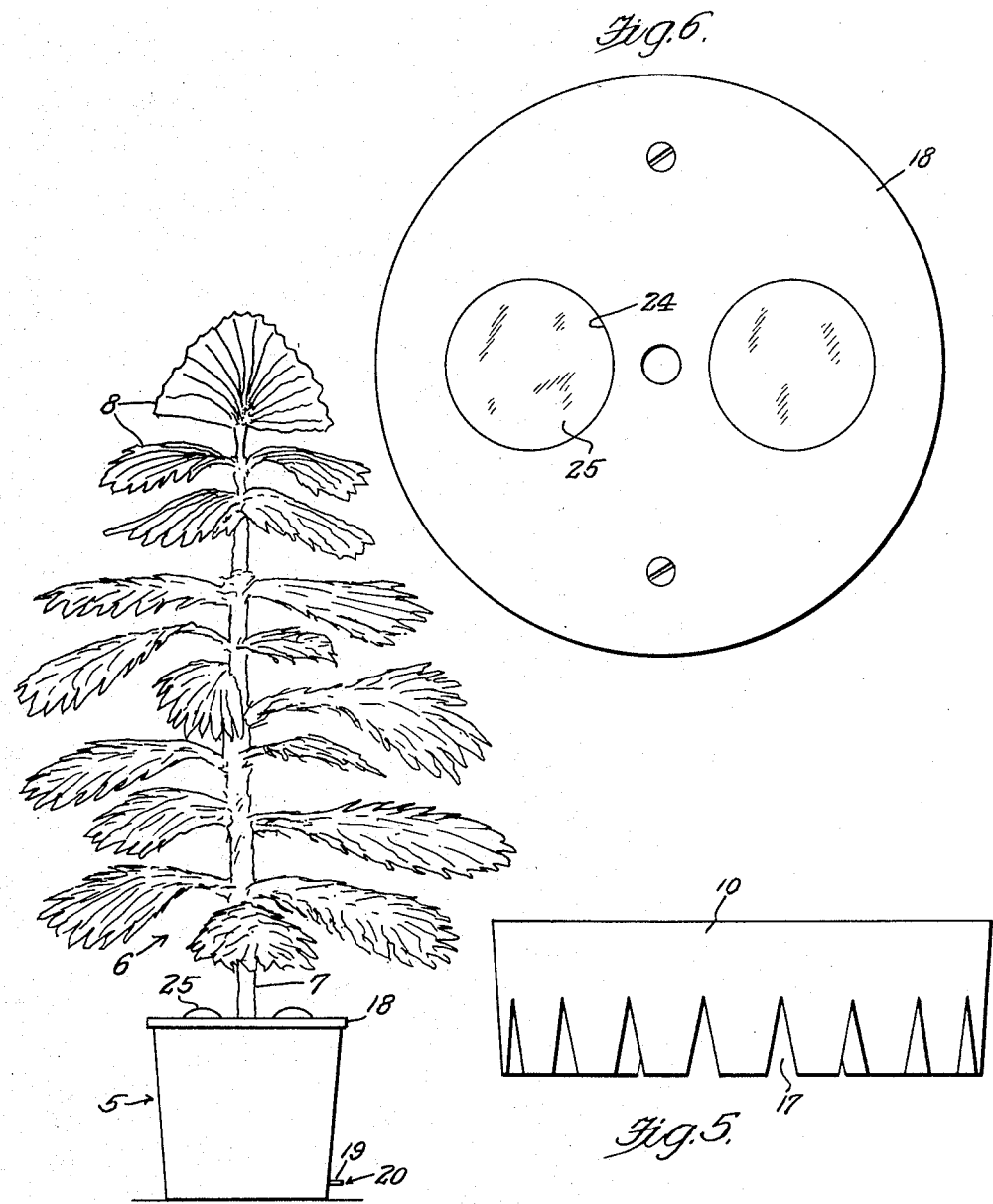
Inventor
John Bacica
By Clarence A. O'Brien
Hyman Berman
Attorneys Feb. 7, 1939.  J. BACICA  2,145,964
ORNAMENTATION
Filed April 16, 1938  2 Sheets—Sheet 2
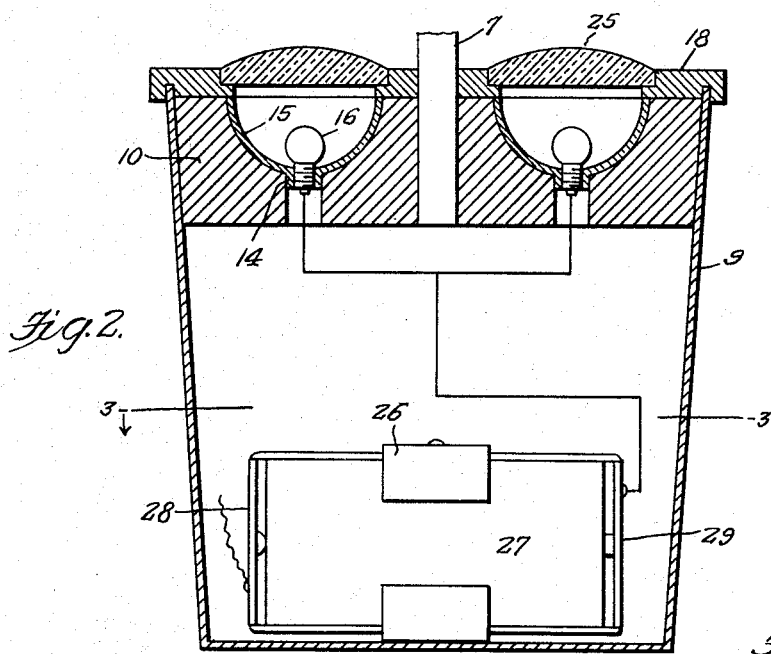
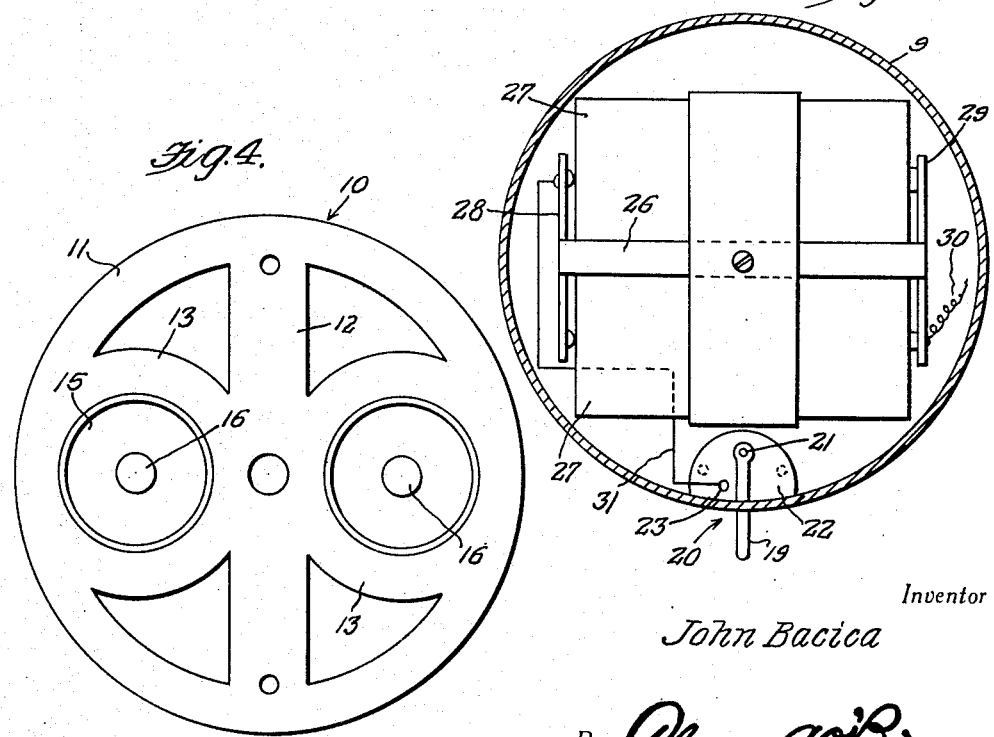
Inventor
John Bacica
By Clarence A. O'Brien
Hyman Berman
Attorneys Patented Feb. 7, 1939

2,145,964

UNITED STATES PATENT OFFICE 2,145,964

ORNAMENTATION

John Bacica, Philadelphia, Pa.

Application April 16, 1938, Serial No. 202,520

1 Claim. (Cl. 240—10)

This invention appertains to new and useful improvements in ornamental structures and more particularly to an illuminated Christmas tree.

The principal object of the present invention is to provide in the art of ornamentation, an illuminated tree which will be appropriate for display on a table or other pieces of furniture.

Another important object of the invention is to provide an ornamental structure in the form of an illuminated artificial tree which when illuminated will offer a brilliant and attractive display.

These and other important objects and advantages of the invention will become apparent to the reader of the following specification.

In the drawings:—

Figure 1 represents a side elevational view of the ornamental tree.

Figure 2 is a vertical sectional view through the base.

Figure 3 is a horizontal sectional view taken substantially on the line 3—3 of Figure 2.

Figure 4 is a top plan view of the socket supporting frame.

Figure 5 is a side elevational view of the frame.

Figure 6 is a top plan view of the cover.

Referring to the drawings wherein like numerals designate like parts, it can be seen that numeral 5 represents the base of the tree while numeral 6 generally refers to the tree proper.

The tree proper consists of the trunk portion 7 and the branches 8, it being preferable that the branches 8 be constructed of "Cellophane" or similar material.

The base 5 consists of the shell 9 having the general conformation of a flower pot and into the upper portion of this is disposed the tapering frame structure 10. This frame 10 is made up of the annulus 11 having the cross construction 12 and the solid portions 13—13 each of which is formed with a pocket to receive a socket 14 and its corresponding reflector 15. In each of the sockets is disposed a bulb 16. The lower portion of the frame 10 is preferably serrated as at 17, (see Figure 5) and is provided with the cover 18 which is provided with a circumferential groove at its underside for receiving the upper edge portion of the shell 9, the cover 18 being of current conductive material as is the shell 9. The cover rests upon the reflector 16 thus establishing electrical connection between the sockets, reflector, shell 9 and switch blade 19 of the switch generally referred to by numeral 20. This switch blade 19 operates through a slot in the shell 9 adjacent the bottom thereof and is pivotally secured as at 21 to the plate 22 of insulation on which is located the contact 23.

As is shown in Figure 2, the trunk 7 of the tree proper extends downwardly through an opening in the cover 18 and into an opening in the frame 10.

The cover 18 is provided with openings 24—24 to receive the lenses 25—25 which overlie the reflectors 15.

A frame structure 26 is suitably mounted upon the bottom of the shell 9 and holds in place a pair of dry-cells 27—27. A connector strip 28 connects the zinc portions of these dry-cells, while the connector 29 connects the carbon portions of these cells, a wire 30 extending from the connector 29 to the socket 14, while the conductor 31 extends from the connector 28 to the contact 23.

Thus whenever the contact blade 19 is swung to engage the contact 23, the bulb 16 will be energized for producing a light projected upwardly and this light will filter through the translucent limbs of the tree 6 and produce a highly appreciable and fascinating illuminated display.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

In an ornamental structure of the class described, a bucket-like base, a source of electrical energy secured in the bottom of the base, a circular skeleton frame wedged into the top of the base and having a pair of cup-like reflectors mounted in the top thereof upon diametrically opposite sides of the center of the frame, a pair of light bulbs mounted in the bottoms of the reflectors, respectively, and connected in circuit with said source, an artificial tree of translucent material arising from the center of said frame, a lens carrier comprising an annular disc fitted over the top edge of the base and around the trunk of the tree, and a pair of convex lenses mounted in said frame in registration with said reflectors.

JOHN BACICA.